United States Patent [19]

Boudet

[11] Patent Number: 4,569,807
[45] Date of Patent: Feb. 11, 1986

[54] METHOD AND APPARATUS FOR MOLDING OPTICAL COMPONENTS

[75] Inventor: Jean Boudet, Bressey sur Tille, France

[73] Assignee: Essilor International Cie Generale d'Optique, Creteil, France

[21] Appl. No.: 514,006

[22] Filed: Jul. 15, 1983

[30] Foreign Application Priority Data

Jul. 16, 1982 [FR] France .................. 82 12478

[51] Int. Cl.$^4$ .............................................. B29D 11/00
[52] U.S. Cl. .................................... 264/2.2; 264/207; 264/161; 264/163; 425/218; 425/292; 425/352; 425/447; 425/553; 425/555; 425/808
[58] Field of Search .................. 264/1.1, 2.2, 2.7, 161, 264/163; 425/808, 218, 292, 352, 447, 449, 553, 555

[56] References Cited

U.S. PATENT DOCUMENTS 3,005,234 10/1961 Oriani et al. .
4,091,057 5/1978 Weber ...................... 264/2.2
4,364,878 12/1982 Laliberte et al. .................... 264/22

FOREIGN PATENT DOCUMENTS 1108415 5/1963 Fed. Rep. of Germany .
2061375 6/1971 France .
2380117 9/1978 France .
2480667 10/1981 France .
55-6054 2/1980 Japan .................................. 264/2.2

Primary Examiner—James Lowe
Attorney, Agent, or Firm—Charles A. Brown; Charles E. Brown

[57] ABSTRACT

As in the conventional manner for molding an optical component, a molding cavity is used in combination with a relief chamber with which the molding cavity can selectively communicate. There is no communication between the relief chamber and the molding cavity while the latter is filled. The molding cavity is then placed in communication with the relief chamber. Subsequently, relative displacement of the relief chamber and the molding cavity parallel to the axis of the combination interrupts such communication. The optical component thus molded may be of any kind, such as an optical lens, specifically an ophthalmic lens.

24 Claims, 11 Drawing Figures

METHOD AND APPARATUS FOR MOLDING OPTICAL COMPONENTS

BACKGROUND OF THE INVENTION

1. Field of the Invention

The present invention generally concerns the manufacture of optical components of all kinds by molding them from a synthetic material.

It is more particularly, but not exclusively, concerned with ophthalmic lenses, more precisely with ophthalmic lenses of negative power having a relatively thick edge, manufactured from a thermoplastic synthetic material, such as polycarbonate, for example.

2. Description of the Prior Art

As is known, one of the general problems to be overcome in molding a synthetic material is that it is necessary to compensate for the shrinkage which occurs on setting, however minimal this may be.

This applies to polycarbonates, even though the shrinkage is in this case less than 1%.

Traditionally, ophthalmic lenses of thermoplastic synthetic material are injection molded, involving the introduction of a thermoplastic synthetic material into an appropriate molding cavity under pressure.

However, apart from the problem of shrinkage on setting inherent to this thermoplastic synthetic material, already mentioned above, and of itself sufficient to result in diverse imperfections of the molded ophthalmic lenses, especially surface defects, there is a supplementary problem in the case, for example, of negative power opththalmic lenses with thick edges, that is to say ophthalmic lenses having a greater thickness along the edge than in the center.

On injection into the molding cavity, the synthetic material tends to flow into the section of the molding cavity of greatest thickness.

Thus beginning at any point on the periphery of the molding cavity, it progresses along this periphery, on either side of the corresponding inlet passage and in a crescent shape, until it closes on itself at the center of the molding cavity when the two arms of this crescent shape join up.

The inevitable result at the corresponding junction is the formation of a substantially radial weld line which, visible on the lens thus obtained, in practice renders it unusable.

To overcome these difficulties, it has already been proposed, inter alia in French Pat. No. 2 380 117 (Application No. 77 03937), to use a molding device comprising, to define a molding cavity, a vertical axis cylindrical sleeve and two molding dies, one concave and the other convex, which shut off the cylindrical sleeve transversely, which are axially spaced from one another and at least one of which, the concave molding die, is mounted in said sleeve so as to be slidable between an initial waiting position and a final molding position, said sleeve having a transverse opening forming an inlet passage adapted for the introduction of synthetic material into the molding cavity and said concave molding die being, in its initial waiting position, beyond the inlet passage relative to the convex molding die, a relief chamber being in communication with said molding cavity and consisting, in practice, of two pockets disposed laterally and each connected to the molding cavity by a separate passage.

Following injection of the synthetic material into the molding cavity under pressure, the concave molding die is moved in the direction towards the convex molding die, which constrains at least part of the synthetic material previously introduced into the molding cavity to be discharged in the direction towards the associated relief chamber, already charged with this synthetic material to a greater or lesser extent on its injection.

A molding device of this kind, providing effective compensation for the shrinkage of the synthetic material used on setting and which, at least in theory, and in practice within certain limits, minimizing the risk of a weld line forming on the ophthalmic lenses obtained, while offering the conjoint advantage of a reduction in the thickness of the lenses at the center, the molding chamber which it incorporates being capable of absorbing a non-negligible proportion of the quantity of synthetic material previously introduced into the molding cavity, has a number of disadvantages, however.

First of all, as the molding cavity remains in communication at all times with the inlet passage and with the relief chamber associated with it, even in the final position of the concave molding die, the lens obtained inevitably has a number of integral sprues, which must be removed and traces of which inevitably remain.

It is therefore necessary to carry out further work on the lens, which is not directly usable.

At best, the molding device in question is able to produce a negative power lens having a thickness at the center of the order of at least 3 mm which, for a typical frontal surface area, results in a very thick edge if the power of the lens is relatively high, so that the lens is virtually unusable unless its front surface area is significantly reduced. However, it is not possible with the molding device in question, by virtue of the injection process which is necessarily utilized and of the continuous nature previously emphasized of the communication between the molding cavity and its inlet passage, to obtain a lens of positive power having a thickness at the edge less than the height at least of said inlet passage, itself necessarily of consequence for injection to be carried out under proper conditions given the viscosity of the synthetic material to be injected, which can result in the lens obtained having a thickness at the center greater than necessary, at the cost of unnecessary consumption of synthetic material and reduced user comfort.

Also by virtue of the injection process necessarily utilized and the continuous nature as emphasized hereinabove of the communication between the molding cavity and the relief chamber associated with the latter, the stresses which are inevitably generated within the lens as it sets extend transversely, on the one hand between the scar corresponding to the inlet passage of the molding cavity and on the other hand the scar corresponding to the passages connecting this molding cavity to the pockets constituting the relief chamber associated with the latter.

This stress pattern, clearly visible on a device for visually displaying such forces, can result in problems regarding the homogeneity of the lens obtained, especially on subsequent treatment of the latter, such as a coloring treatment, for example.

The general objects of the present invention are a method and a device for molding optical components of any kind with which it is possible to minimize, or even eliminate, the aforementioned disadvantages and offering, among its advantages, the production of finished and directly usable optical components, such as ophthalmic lenses, for example.

SUMMARY OF THE INVENTION

The invention consists in a method for molding an optical component from a synthetic material wherein a molding cavity is filled with an appropriate quantity of synthetic material while not in communication with a relief chamber, said molding cavity is then pressurized and, during such pressurization, placed in communication with said relief chamber, and relative movement of said relief chamber and said molding cavity parallel to an axis of the combination then interrupts said communication.

In one embodiment of the invention, said relief chamber is open at the time said molding cavity is filled and is axially spaced from said molding cavity by a distance sufficient for there to be no communication therewith while it is being filled, and the amplitude of relative displacement of said relief chamber and said molding cavity is sufficient for communication between said molding cavity and said relief chamber to be first established and then interrupted during such displacement.

Alternatively, in a second embodiment of the invention, said relief chamber is not opened until after said molding cavity is filled, directly in line with the latter, for example, and the amplitude of relative displacement of said relief chamber and said molding cavity is sufficient that communication between said molding cavity and said relief chamber is wholly interrupted during such displacement.

In either case, said molding cavity is preferably defined by a cylindrical sleeve and two molding dies which shut off said cylindrical sleeve transversely, which are axially spaced from one another and at least one of which, hereinafter referred to as the main molding die, is movable relative to the other, hereinafter referred to as the secondary molding die, and the inlet passage by virtue of which said molding cavity is filled is formed in said cylindrical sleeve.

Be this as it may, by virtue of the capacity provided in accordance with the invention for relative displacement of the means used to define the molding cavity and those used to form a relief chamber adapted to communicate selectively therewith, the advantage of this relief chamber is that no sprue is formed.

Since conjointly, and in a manner known per se, the main molding die during its displacement from its initial waiting position to its final molding position preferably completely shuts off the inlet passage of the molding cavity, so that the inlet passage does not itself produce any sprue, the ophthalmic lens obtained in accordance with the invention offers the advantage of being directly usable, without any reworking, having no sprue integral with it.

Also, the stresses which develop within it as it sets are no longer polarized by any scars due to sprue, and their distribution is more regular.

In accordance with the invention, the relief chamber is preferably of annular configuration around the axis of the combination.

Given the capacity for relative displacement of this relief chamber and the molding cavity, this has the advantageous result of direct elimination, without reworking of the ophthalmic lens obtained, of the initial peripheral area of the lens, which is precisely the area in which unwanted tensions and stresses are most likely to arise on setting.

Also, by virtue of its annular configuration, the relief chamber utilized in accordance with the invention may be of relatively large size, providing for thicknesses at the center of the ophthalmic lenses obtained as small as may be required, of the order of 1 mm, for example.

In any event, the thickness of the edge of these ophthalmic lenses is with advantage independent of the height of the inlet passage of the molding cavity, whether the lenses are of negative or positive power.

Also, using the same molding device and the same filling arrangement of the molding cavity, this relief chamber offers the advantage of providing for the manufacture of ophthalmic lenses of different volumes and thus of different powers, which is favorable to minimizing their manufacturing cost.

Finally, the molding method and device in accordance with the invention are equally applicable to the filling of the molding cavity by injection under pressure as to filling of this molding cavity drip feed fashion, and thus at normal pressure, without the disadvantages inherent in pressurized injection.

U.S. Pat. No. 3,005,234 discloses control of the thickness of a molded optical component, more specifically an optical lens.

However, in this U.S. patent the thickness is controlled by mechanical means, through positive contact with an abutment member provided for this purpose.

In the corresponding device, there is no "relief chamber" in the sense of the present application adapted to contain excess material on closure of the molding cavity.

Such excess material merely flows freely out from the molding cavity on closing it.

This does not apply the present invention in which, to be contrary, a specific relief chamber is utilized.

A relief chamber of this kind offers the advantage of providing for volumetric control of the quantity of material permitted to flow out from the molding cavity on its closure. This provides a totally reliable means of strictly controlling the thickness of the molded optical component, without utilizing any form of abutment member, always susceptible to go out of adjustment and/or to deform.

Other objects and advantages will appear from the following description of an example of the invention, when considered in connection with the accompanying drawings, and the novel features will be particularly pointed out in the appended claims.

DESCRIPTION OF THE PREFERRED EMBODIMENTS

The figures generally relate, by way of example, to the application of the invention to the molding of an ophthalmic lens 10 (FIGS. 3A and 6) of negative power from a thermoplastic synthetic material, for example polycarbonate.

As is known, an ophthalmic lens 10 of this kind has a thick edge, that is to say its thickness along its perimeter is greater than that at its center.

Figure 1:
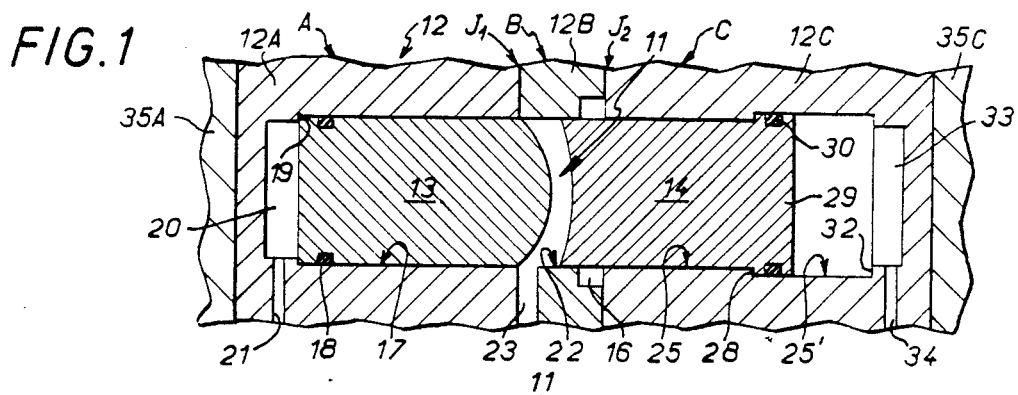
FIG. 1 is a partial view in axial cross-section through a molding device in accordance with the invention.

In a manner known per se, the device utilized in accordance with the invention for molding an ophthalmic lens 10 of this kind comprises means adapted to define a molding cavity 11 the configuration of which corresponds to that of ophthalmic lens 10 (FIG. 1).

In a manner also known per se, the means adapted to define molding cavity 11 comprise, in both of the two embodiments shown, a cylindrical jacket 12 and two molding dies 13, 14, one having a convex molding surface and the other a concave molding surface, closing off said jacket 12 transversely, spaced from one another and with at least one, hereinafter referred to for convenience as the main molding die, mounted in jacket 12 so as to be movable in the axial direction relative to the other, hereinafter referred to for convenience as the secondary molding die, between an initial waiting position and a final molding position.

In these embodiments, it is molding die 13 with the convex molding surface (the convex molding die) which constitutes the main molding die and molding die 14 with the concave molding surface (the concave molding die) which constitutes the secondary molding die.

In a manner also known per se, the molding device in accordance with the invention further comprises means adapted to form a relief chamber 16 adapted to communicate selectively with molding cavity 11.

In the embodiment shown in FIGS. 1 to 3, the means adapted to form relief chamber 16 are such that this chamber is always open within cylindrical jacket 12, as will be described in more detail hereinafter.

Generally speaking, the molding device in accordance with the invention is characterized by the facility for relative displacement parallel to the axis of the combination of the means adapted to define molding cavity 11, on the one hand, and the means adapted to form relief chamber 16, on the other hand.

In the embodiment shown in FIGS. 1 to 3, this capacity for relative displacement results from the fact that, whereas relief chamber 16 is fixed, molding cavity 11 is mobile, secondary molding die 14 being, like main molding die 13, mounted movably between an initial waiting position and a final molding position, parallel to the axis of the combination.

In practice, in this embodiment, the molding device in accordance with the invention is, broadly speaking, axially divided into three distinct parts A, B and C, axially movable relative to one another and comprising a first part A, in which main molding die 13 is movably mounted, a second part B in which relief chamber 16 is formed, and a third part C in which secondary molding die 14 is movably mounted.

In this embodiment, sleeve 12 is therefore itself divided axially into three distinct parts 12A, 12B, 12C.

Figure 2A:
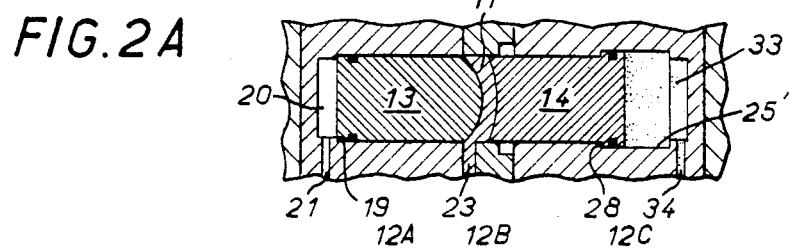
FIGS. 2A, 2B and 2C correspond to FIG. 1 to a smaller scale and illustrate various phases in the utilization of the molding device in accordance with the invention during molding.
Figure 3A:
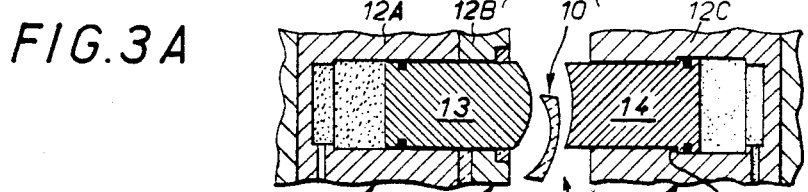
FIGS. 3A and 3B likewise illustrate various phases in the utilization of the molding device in accordance with the invention during extraction from the mold after molding.
Figure 3B:
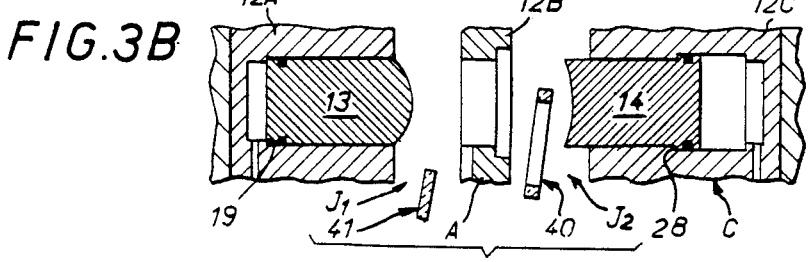

Part 12A of sleeve 10 forms a cylinder 17 in which main molding die 13 is slidably mounted, which is sealed by a seal 18 provided for this purpose in an annular groove in main molding die 13, and the base of which is materialized by a transverse shoulder 19 adapted to provide an axial abutment for molding die 13, to define its initial waiting position, as shown in FIGS. 1, 2A and 3B.

To the rear of cylinder 17, and thus beyond transverse shoulder 19 forming the base thereof, part 12A of cylindrical sleeve 12 forms a chamber 20 which has a smaller transverse cross-section than cylinder 17 in the embodiment shown, disgorges into cylinder 17 over its entire surface in this embodiment, and is adapted to be connected to a first source of pressurized fluid (not shown) through a lateral passage 21.

Part 12B of cylindrical sleeve 12, designed in particular to define molding cavity 11 and form relief chamber 16, generally constitutes a cylinder 22 continuous with cylinder 17 of aforementioned part 12A and adapted, by virtue of an inlet passage 23 disposed laterally, to be supplied with a synthetic molding material.

In accordance with one aspect of the invention, relief chamber 16 in this part 12B of cylindrical sleeve 12 has an annular configuration and extends circumferentially and continuously around the axis of the combination.

In practice, it is a groove formed annularly on the inside wall of sleeve 12, more precisely on part 12B of the latter, and disgorging annularly over its entire surface into said inside wall. This groove of itself constitutes the communication passage by virtue of which molding cavity 11, in accordance with a process to be described in more detail hereinafter, is able to communicate with it.

As previously, part 12C of cylindrical sleeve 12 forms a cylinder 25 in which secondary molding die 14 is slidably mounted. As previously, in the embodiment shown, cylinder 25 is continuous with cylinder 22 in part 12B of said cylindrical sleeve 12 and with cylinder 17 in part 12A thereof.

In other words, in the embodiment shown, cylinders 17, 22 and 25 have the same cross-section.

However, in part 12C of sleeve 12, cylinder 25 is extended beyond a transverse shoulder 28 by a cylinder 25' in which is slidably mounted in fluid-tight manner a piston 29 to which is attached secondary molding die 14, a seal 30 being provided for this purpose in an annular groove in piston 20.

In the embodiment shown, the transverse cross-section of cylinder 25' is larger than that of cylinder 25 and thus those of the aforementioned cylinders 17, 22 and 25.

Be this as it may, transverse shoulder 28 which separates it from cylinder 25 is, as previously, adapted to define the initial waiting position of concave molding die 14, as shown in FIGS. 1 and 2A.

As will emerge hereinafter, this initial waiting position also corresponds, in the case of secondary molding die 14, to an extraction position, as shown in FIGS. 3A and 3B.

Figure 2B:
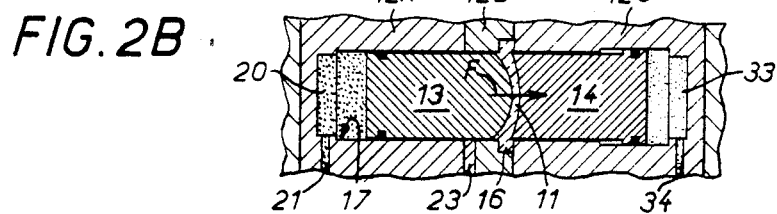
Figure 2C:
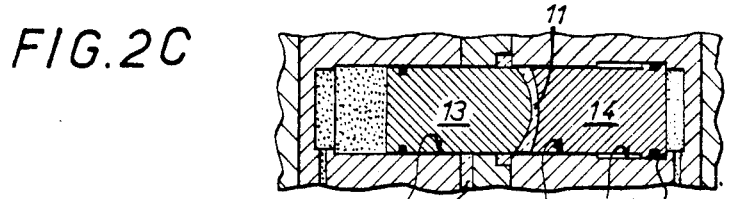

The base of cylinder 25' is materialized by a transverse shoulder 32 adapted to define the final molding position of secondary molding die 14, as shown in FIG. 2C. To the rear of this cylinder 25', that is say beyond transverse shoulder 32 which thus forms the base, part 12C of cylindrical sleeve 12 comprises a chamber 33 which disgorges over its entire cross-section into cylinder 25' in the embodiment shown and which is adapted to be connected to a source of pressurized fluid (not shown) by a lateral passage 34.

Naturally the molding device constituted in this way may be associated, by means of arrangements which will be evident to those skilled in the art and which therefore will not be described here, with a surround, providing in particular for mounting it on the plates of a press, in cooperation with appropriate guiding means, and which can also implement thermal control of the device.

In the figures, a part 35A of this surround associated with part 12A of cylindrical sleeve 12 and a part 35C associated with part 12C of the latter are shown.

Be this as it may, it results from the foregoing that, in the embodiment shown in FIGS. 1 to 3, the molding device in accordance with the invention comprises, transversely and perpendicular to the axis of the combination, two distinct sealing planes J1 and J2, namely sealing plane J1 between parts A and B and sealing plane J2 between parts B and C.

In practice, in the initial waiting position as defined hereinabove, and as shown in FIGS. 1 and 2A, the main and secondary molding dies 13 and 14 both have the perimeter of their respective molding surface disposed short of the communication passage by virtue of which molding cavity 11 is able to communicate with relief chamber 16.

In other words, in this initial waiting position of main and secondary molding dies 13 and 14, molding cavity 11 is not in communication with relief chamber 16 (FIGS. 1 and 2A).

To hold molding die 14 in its initial waiting position, fluid under pressure is fed into chamber 33 and cylinder 25′ of part 12C of cylindrical sleeve 12, through the corresponding passage 34 and as shown schematically by the shaded area in FIG. 2A. The fluid pressure is such that, in view of the transverse cross-sections utilized, the resulting axial force on secondary molding die 14 is greater than that to which it is subjected when molding cavity 11 is filled with an appropriate quantity of synthetic material via inlet passage 23, as represented schematically in chain-dotted line in FIG. 2A.

In the embodiment shown, molding cavity 11 is filled by injection and thus under pressure, the pressure of the fluid fed into chamber 33 and cylinder 25′ of part 12C of cylindrical sleeve 12 being chosen accordingly, as already indicated.

After filling of molding cavity 11, the pressure in chamber 33 and cylinder 25′ of part 12C of cylindrical sleeve 12 is slightly reduced and at the same time, as represented schematically by the shading in FIG. 2B, chamber 20 of part 12A of said cylindrical sleeve 12 is in turn fed with fluid under pressure, through passage 21. The pressure of this fluid is chosen so that, in view of the transverse cross-sections utilized, there results axial displacement in the direction of arrow F in FIG. 2B and at a predetermined speed of the combination of main molding die 13 and secondary molding die 14, from their initial waiting position as shown in FIG. 2A to their final molding position as shown in FIGS. 2C. Thus molding cavity 11 defined between them is displaced axially.

In accordance with the invention, the amplitude of the resulting axial displacement between molding cavity 11 and relief chamber 16 is sufficient that, during this displacement, communication is first established between molding cavity 11 and relief chamber 16 (FIG. 2B) and then interrupted (FIG. 2C).

In other words, in accordance with the invention, the arrangement is such that there is initially no communication between relief chamber 16 and molding cavity 11 during filling of the latter, relief chamber 16 being, to this end, at a sufficient axial distance from molding cavity 11 that such communication occurs only after filling of the latter, and, after such communication, relative displacement of molding cavity 11 and relief chamber 16 parallel to the axis of the combination again interrupts this communication.

In a first stage, on its displacement, main molding die 13 shuts off inlet passage 23 of molding cavity 11 so that from this time the latter is isolated from inlet passage 23.

Then, in a second stage, molding cavity 11 moves in line with relief chamber 16, so that a non-negligible proportion of the synthetic material previously fed into molding cavity 11 is driven into relief chamber 16 by the action of main molding die 13, the pressure to which this is subjected being sufficient to bring this about.

It will be noted that molding cavity 11 then communicates with relief chamber 16 in annular fashion, around the entire perimeter of molding cavity 11.

Finally, in a third stage, after filling of relief chamber 16, which brings main molding die 13 closer to secondary molding die 14 and thus reduces the thickness at the center of the ophthalmic lens during molding, displacement of secondary molding die 14 and main molding die 14 continues, the pressure to which the latter is subject being maintained to this end so that, by virtue of a slicing action, molding cavity 11 is isolated from relief chamber 16 (FIG. 2C).

Naturally, the pressure to which molding die 13 is subjected is further maintained, to compensate for the shrinkage which inevitably occurs in the synthetic material contained in molding cavity 11 when it sets.

After a time sufficient for this setting, sealing plane J2 between parts B and C of the molding device in accordance with the invention is opened (FIG. 3A) and, by virtue of the pressure to which it is subjected, secondary molding die 14 is returned to its initial position, which then constitutes its extraction position.

As a result, the molded ophthalmic lens 10 is ejected, as shown, and from what has been stated previously it is readily understood that ophthalmic lens 10 has the advantage of incorporating no molding sprue, so that it may be used directly.

Main molding die 13 is then returned to its initial position and sealing plane J1 between parts A and B of the molding device in accordance with the invention is open to permit, on the one hand, removal from the mold of a ring 40 resulting from the setting of the synthetic material previously forced into relief chamber 16, the groove constituting the latter being preferably disposed in line with sealing plane J2 to facilitate removal from the mold of ring 40, and, on the other hand, removal from the mold of a sprue 41 corresponding to inlet passage 23, the latter being for preference formed in line with the opposite sealing plane J1, also to facilitate removal from the mold of sprue 41, on each side of part 12B of cylindrical sleeve 12.

Figure 4:
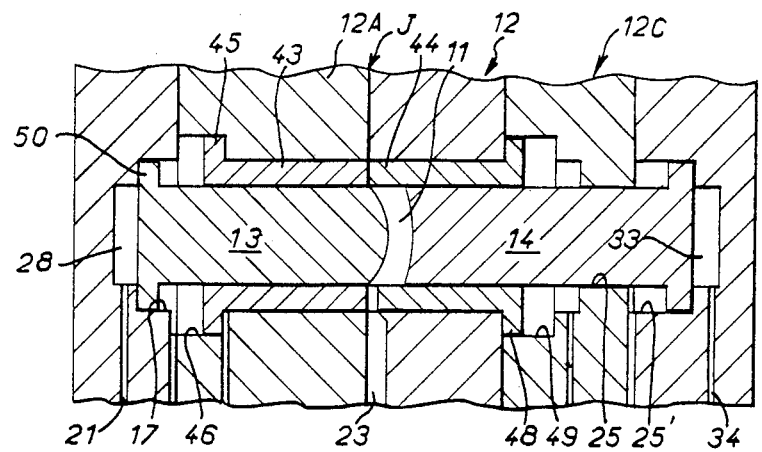
FIG. 4 is a view analogous to that of FIG. 1 and relating to an alternative embodiment.
Figure 5A:
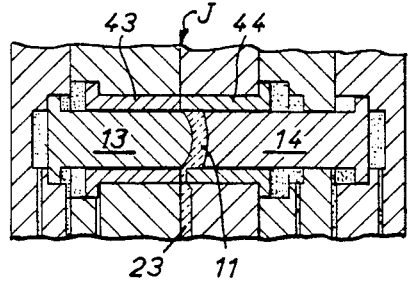
FIGS. 5A, 5B and 5C illustrate, to a smaller scale, various phases in the utilization of this embodiment during molding.
Figure 5B:
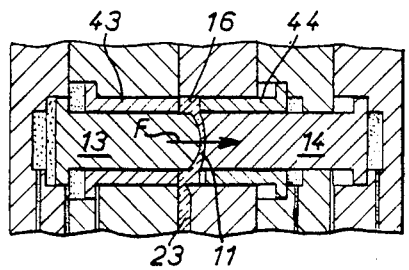
Figure 5C:
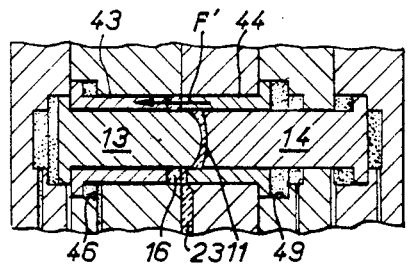
Figure 6:
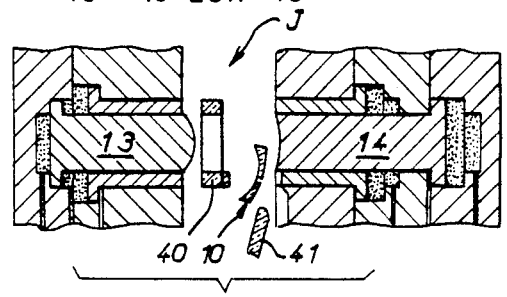
FIG. 6 illustrates its utilization during extraction from the mold which follows molding.

In the embodiment shown in FIGS. 4 to 6, relief chamber 16 is not formed until after molding cavity 11 is filled and, for preference and as shown, is then formed directly in line with molding cavity 11.

In practice, in this embodiment, two tubular sheaths 43, 44 forming part of cylindrical sleeve 12 annularly enclose molding dies 13, 14, in line with one another. Relief chamber 16 is formed between said tubular sheaths 43 and 44, by making at least one of them movable parallel to the axis of the combination.

In the embodiment shown, both of tubular sheaths 43 and 44 are movable parallel to the axis of the combination.

In practice, at its end opposite tubular sheath 44, tubular sheath 43 is attached to a piston 45 which is movable in a cylinder 46 which is formed in part 12A of cylindrical sleeve 12, the respective ends of which are adapted to be alternately connected to a source of fluid under pressure to control displacement of tubular sheath 43.

Tubular sheath 44 is similarly treated, being at its end opposite tubular sheath 43 attached to a piston 48 movable in a cylinder 49 in part 12C of cylindrical sleeve 12, but only one end of cylinder 49, that farthest from tubular sheath 43, is adapted to be connected to a source of fluid under pressure.

Also, in the embodiment shown, main molding die 13, like secondary molding die 15, is attached to a piston 50 and it is the latter which is mounted slidably in cylinder 17 of part 12A of cylindrical sleeve 12, cylinder 17 disgorging over its entire cross-section into cylinder 46 in which is slidably mounted piston 45 to which tubular sheath 43 is attached.

In other respects, the arrangements are analogous to those already described and, in the drawings, the same reference numbers have been re-used for the same components, it being understood that, ignoring tubular sheaths 43 and 44, cylindrical sleeve 12 is in only two parts 12A and 12C, the molding device in accordance with the invention thus comprising only one sealing plane J in this embodiment. It will also be understood that cylinder 17 in which is slidably mounted main molding die 13 is formed by the bore of tubular sheaths 43, that cylinder 25 in which is slidably mounted secondary molding die 14 is formed partly by the bore of tubular sheath 44 and partly in part 12C of said cylindrical sleeve 12, and that tubular sheaths 43 and 44 which form part of cylindrical sleeve 12 are slidably mounted in parts 12A and 12C of the latter, respectively.

The pressures utilized are such that, taking into account the transverse cross-sections utilized, tubular sheaths 43 and 44 are in end-to-end abutment during a first stage in which molding cavity 11 is filled (FIG. 5A).

Then, in a second stage, the pressure in cylinder 49 in which is slidably mounted a head 48 to which tubular sheath 44 is attached is reduced and, conjointly, main molding die 13 moving in the direction towards secondary molding die 14 under the action of the pressure to which it is subjected, tubular sheath 44 moves away from tubular sheath 43 so that relief chamber 16 is formed axially between them, in line with molding cavity 11, with molding cavity 11 still in communication with its inlet passage 23 in the embodiment shown (FIG. 5B).

However, main molding die 13 is brought closer to secondary molding die 14 (arrow F in FIG. 5B) until it occupies its final molding position, for transverse pressurized retaining of molding cavity 11, whereas tubular sheaths 43 and 44 move axially in opposite directions (arrow F' in FIG. 5C), cylinder 49 associated with tubular sheath 44 being pressurized to this end and the pressure in cylinder 46 associated with tubular sheath 43 being reversed.

The result of relative axial movement between molding cavity 11 and relief chamber 16 is, as previously, to interrupt the communication previously established between said molding cavity and said relief chamber 16 and thus, as previously, the slicing off of the material remaining in molding cavity 11 from that which has moved therefrom into relief chamber 16.

During its movement between its initial waiting position and its final molding position, main molding die 13, as previously, shuts off inlet passage 23 of molding cavity 11, so that the cavity is then isolated not only from relief chamber 16 but also from its inlet passage 23.

Consequently, and as previously, ophthalmic lens 10 obtained after opening sealing plane J and passage to the final extraction position of secondary molding die 14 is directly usable, having no molding sprue attached to it (FIG. 6).

On the other hand, and as previously, ring 40 corresponding to relief chamber 16 and sprue 41 corresponding to inlet passage 23 of molding cavity 11 are individually removed from the mold, independently of ophthalmic lens 10, on opening sealing plane J and after return to the initial waiting position of main molding die 13 and tubular sheath 43.

It will be noted that in the embodiment shown in FIGS. 4 to 6, secondary molding die 14 does not move in the molding of lens 10, its mobility being relevant only to the removal of the lens from the mold, so that in this embodiment, unlike the previous embodiment, it is the relief chamber which is movable while the molding cavity is fixed.

It will also be noted that in this embodiment secondary molding die 14 is movable between an initial waiting and molding position and a final extraction position, and that main molding die 13 and secondary molding die 14 are movable in opposite directions relative to one another between their respective initial and final positions, as defined.

It will be understood that various changes in the details, materials and arrangements of parts, which have been herein described and illustrated in order to explain the nature of the invention, may be made by those skilled in the art within the principle and scope of the invention as expressed in the appended claims.

For example, while in the embodiment shown in FIGS. 1 to 3 it is the molding cavity which is mobile and the relief chamber which is fixed, the opposite arrangement could also be adopted.

Likewise, in the embodiment shown in FIGS. 4 to 6, the relief chamber could be fixed instead of movable, in which case the molding cavity would be movable.

As an alternative, the molding cavity and the relief chamber, whether the latter is open before or is not formed until after filling of the molding cavity, could both be movable, in opposite directions relative to one another, for example.

It is sufficient in all cases that the relative axial displacement which is possible between the molding cavity and the relief chamber be sufficient to provide only temporary communication between the relief chamber and the molding cavity.

In other words, it is sufficient that in the initial waiting position the peripheral edge of the respective molding surfaces of the two molding dies be short of the relief chamber and that they be beyond the latter in the final molding position.

Although the annular configuration specifically described hereinabove for the relief chamber is preferred, for the reasons discussed, any other configuration of the relief chamber may be considered.

Also, the molding cavity is not necessarily filled by injection under pressure.

On the contrary, and this constitutes an advantage of the present invention, it may be also filled by a drip feed method, that is to say at normal pressure, using a process of the kind disclosed in French Patent Application No. 82 06936 of Apr. 22, 1982.

Finally, the application of the invention is not limited to the use of polycarbonate, as specifically described hereinabove, but extends more generally to the use of any injectable or extrudable thermoplastic or thermohardenable material.

Nor is the application of the invention limited to the manufacture of ophthalmic lenses of negative power with thick edges, instead extending to encompass the manufacture of all types of ophthalmic lens. For example, it may be used to manufacture convergent ophthalmic lenses with thin edges for which, for the reasons stated, injection molding is not suitable.

The invention is equally applicable to the manufacture of any form of optical lens as to any form of optical component (lens, mirror or filter, for example), whatever the form of the front surface thereof, especially in cases where the optical component is required to have relatively reduced thickness at the center.

It is claimed:

1. A method for molding an optical component from synthetic material in a molding device including a suitably shaped molding cavity and a relief chamber for accommodating excess synthetic material selectively communicable with the molding chamber, the molding cavity and the relief chamber being relatively axially displaceable, the method comprising the steps of: filling the molding cavity with an appropriate amount of synthetic material while the molding cavity is out of communication with the relief chamber, pressurizing the molding cavity and bringing the molding cavity into communication with the relief chamber, thereafter axially displacing the molding cavity relative to the relief chamber to interrupt communication therebetween and to sever synthetic material in the molding cavity from synthetic material in the relief chamber, and opening the molding cavity and discharging the molded optical component.

2. The method according to claim 1, wherein the relief chamber is in axially spaced relation with respect to the molding cavity during the filling of the molding cavity, the molding cavity being brought into communication with the relief chamber by axial displacement of the molding chamber relative to the relief chamber before relative axial displacement to interrupt communication therebetween.

3. The method according to claim 2, wherein the molding cavity defined by a cylindrical sleeve and two axially spaced molding dies sealingly arranged in the sleeve is axially displaceable relative to the relief chamber to selectively bring the molding cavity into communication with the relief chamber and interrupt communication therebetween.

4. The method according to claim 1, wherein the relief chamber is formed after filling the molding cavity.

5. The method according to claim 4, wherein the relief chamber is formed in transverse alignment with the molding cavity.

6. The method according to claim 5, wherein the molding cavity is defined by a cylindrical sleeve and two axially spaced molding dies sealingly arranged in the cylindrical sleeve, the cylindrical sleeve including a pair of tubular sheaths, one of the tubular sheaths being movable relative to the other tubular sheath to form the relief chamber after filling the molding cavity.

7. The method according to claim 6, wherein both tubular sheaths are axially movable to interrupt communication between the molding cavity and the relief chamber.

8. The method according to claim 6, wherein one of the molding dies is axially movable to pressurize the synthetic material in the molding cavity, and both of the molding dies are axially movable to discharge the molded optical component.

9. The method according to claim 6, wherein the molding cavity remains in communication with an inlet channel for filling the molding cavity substantially until the communication between the molding cavity and the relief chamber is interrupted.

10. A method for molding an optical component from synthetic material in a molding device comprising a molding cavity and a relief chamber selectively communicable with the molding cavity by axial displacement of the molding cavity relative to the relief chamber comprising the steps of: filling the molding cavity with an appropriate quantity of synthetic material for forming an optical component while the molding cavity is axially spaced from and out of communication with the relief chamber, pressurizing the molding cavity and axially displacing the molding cavity relative to the relief chamber to bring the molding cavity into communication with the relief chamber so that excess synthetic material is forced out of the molding cavity into the relief chamber, thereafter again axially displacing the molding cavity relative to the relief chamber to break communication between the molding cavity and the relief chamber and to form the peripheral edge of the optical component, depressurizing the molding chamber and discharging the optical component from the molding cavity.

11. A method for molding an optical component from synthetic material in a molding device comprising a molding cavity and a relief chamber adapted to be formed by two relatively displaceable parts in spaced apart relation and eliminated when the two parts are close together, the molding cavity thereby being selectively communicable with the relief chamber, wherein the method comprises the steps of: filling the molding cavity with an appropriate quantity of synthetic material for forming an optical component while the parts are close together, pressurizing the molding cavity and moving the parts away from each other to form the relief chamber directly in communication with the molding cavity, and thereby allowing excess synthetic material to be forced out of the molding cavity into the relief chamber, then axially displacing the molding cavity relative to the relief chamber to break communication therebetween and to form the peripheral edge of the optical component, relieving the pressure in the molding cavity and discharging the optical component from the molding cavity.

12. A device for molding optical components from synthetic material, said device comprising means defining a molding cavity having a configuration adapted to form a desired optical component, means for filling said molding cavity with synthetic material, means defining a relief chamber selectively communicable with said molding cavity, means for pressurizing the synthetic material in said molding cavity and means for controlling communication between said molding cavity and said relief chamber so that during filling of said molding cavity said molding cavity and said relief chamber are out of communication with each other and during pressurization said molding chamber and said relief chamber are in communication with each other, and means for mounting said molding cavity relative to said relief chamber for relative axial displacement for interrupting communication between said molding cavity and said relief chamber, and for severing synthetic material in said molding cavity from the synthetic material in such relief chamber.

13. The device according to claim 12, wherein said means defining said molding cavity comprises a cylindrical sleeve and two axially spaced molding dies sealingly arranged in said sleeve, means mounting said molding cavity for axial movement between an initial filling position and a molding position, said means defining a relief chamber comprising a fixed part of said cylindrical sleeve.

14. The device according to claim 13, wherein said molding cavity has a third position axially beyond said molding position relative to said initial position for trimming the periphery of the optical component.

15. The device according to claim 14, wherein said device comprises first, second and third parts axially movable relative to one another, one of said dies being slidably mounted in said first part, said relief chamber being formed in said second part and said other die being slidably mounted in said third part.

16. The device according to claim 14, wherein said relief chamber is annular and in continuous annular communication with said molding cavity in said molding position.

17. The device according to claim 16, wherein said relief chamber comprises a groove in said cylindrical sleeve opening radially inwardly directly into said molding cavity.

18. The device according to claim 12, wherein said means for defining said molding cavity comprises two axially spaced molding dies sealingly arranged in a cylindrical sleeve, said cylindrical sleeve comprising two tubular sheaths, one of said tubular sheaths being mounted for axial movement relative to the other tubular sheath, said relief chamber being formed in said cylindrical sleeve between said tubular sheaths in axial spaced relation.

19. The device according to claim 18, wherein both of said tubular sheaths are mounted for axial movement.

20. The device according to claim 18, wherein one of said molding dies is axially movable between an initial position and a final position and the other of said molding dies is axially movable between an initial position and a final position for discharging the optical component.

21. The device according to claim 17, wherein said molding dies are movable relative to each other in opposite directions between their respective initial and final positions.

22. A device according to claim 13, wherein said means for filling said molding cavity includes an inlet passage in said cylindrical sleeve, one of said dies sealing off said inlet passage as said molding cavity is brought into communication with said relief chamber.

23. The device according to claim 18, wherein said means for filling said molding cavity includes an inlet passage in said cylindrical sleeve, said inlet passage being in communication with said molding cavity when said molding cavity is in communication with said relief chamber, communication between said molding cavity and said inlet passage being interrupted in the course of axial displacement for interrupting communication between said molding cavity and said relief chamber.

24. The device according to claim 12, wherein said relief chamber has a predetermined volume.

* * * * *